(12) United States Patent
Desabhatla et al.

(10) Patent No.: US 9,157,406 B2
(45) Date of Patent: Oct. 13, 2015

(54) SYSTEMS AND METHODS FOR INITIALIZING A GENERATOR

(71) Applicant: General Electric Company, Schenectady, NY (US)

(72) Inventors: Sreedhar Desabhatla, Munich (DE); William Robert Pearson, Roanoke, VA (US); John Andrew Leonard, Salem, VA (US); John Carver Maters, Taylors, SC (US); Shashidhar Nibhanupudi, Tarnaka (IN); Sudeep Pathak, Miyapur (IN)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 14/173,616

(22) Filed: Feb. 5, 2014

(65) Prior Publication Data
US 2015/0219055 A1 Aug. 6, 2015

(51) Int. Cl.
| | | |
|---|---|---|
| *F01D 19/00* | (2006.01) | |
| *F02N 11/04* | (2006.01) | |
| *H02P 1/46* | (2006.01) | |
| *F02N 11/08* | (2006.01) | |

(52) U.S. Cl.
CPC ............... *F02N 11/04* (2013.01); *F02N 11/08* (2013.01); *H02P 1/46* (2013.01)

(58) Field of Classification Search
CPC ....................................................... F01D 19/00
USPC ........................................................... 290/31
See application file for complete search history.

(56) References Cited

U.S. PATENT DOCUMENTS

| | | | | |
|---|---|---|---|---|
| 4,772,802 | A * | 9/1988 | Glennon et al. | 290/31 |
| 5,563,497 | A | 10/1996 | Iwatani et al. | |
| 5,663,632 | A | 9/1997 | Roseman et al. | |
| 8,994,199 | B2 * | 3/2015 | Desabhatla | 290/40 B |
| 2008/0309084 | A1 | 12/2008 | Murugesan et al. | |
| 2011/0289934 | A1 * | 12/2011 | Desabhatla | 60/778 |

FOREIGN PATENT DOCUMENTS

| | | | |
|---|---|---|---|
| EP | 2357723 A1 | | 8/2011 |
| JP | 06159098 A | * | 6/1994 |
| JP | 2011132951 A | * | 7/2011 |
| JP | 2011132956 A | * | 7/2011 |
| JP | 2011153621 A | * | 8/2011 |
| RU | 2216637 C1 | * | 11/2003 |
| WO | 2010058028 A2 | | 5/2010 |

OTHER PUBLICATIONS

European Search Report; Application No. EP 15153550.7; Dated Jul. 22, 2015; 8 pages.

* cited by examiner

*Primary Examiner* — Joseph Waks
(74) *Attorney, Agent, or Firm* — Fletcher Yoder, P.C.

(57) ABSTRACT

A method for initializing a generator may include sending a field reference voltage to an exciter that may provide a direct current (DC) current and a DC voltage to a rotor of a generator based on a current set point that corresponds to the field reference voltage. The method may then include receiving a voltage feedback signal output by the generator, determining one or more locations of one or more poles of the generator based on the voltage feedback signal, and sending one or more firing signals to one or more switches of a starter after determining the locations of the poles, such that the switches couple the voltage to a stator of the generator.

20 Claims, 3 Drawing Sheets

SYSTEMS AND METHODS FOR INITIALIZING A GENERATOR

BACKGROUND

The subject matter disclosed herein generally relates to initializing a generator. In particular, the subject matter disclosed herein relates to reducing an amount of time for a starter component to accelerate a generator and a turbine up to a speed that the turbine can drive the generator.

When a generator is not in use, a shaft of the generator may be rotated by a turning gear motor at a relatively slow speed (e.g., 6 rpm). After the generator receives a command to initialize and output power, the starter component may take several minutes to accelerate the generator and the turbine up to a speed at which the generator may output power to an electric grid. In certain systems, generators may be requested to provide power during peak usage times. As the demand for power increases during peak usage times, the demand to place generators online more quickly increases. Accordingly, systems and methods that decrease an amount of time used initialize generators are desirable.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system may include a turbine and a generator that may be coupled together, such that the generator may provide power to an electrical grid. The system may also include a starter that may couple a voltage to a stator of the generator. The starter may include a first controller that may control the firing of one or more switches coupled to the stator. The system may also include an exciter that may couple a direct current (DC) current and DC voltage to a rotor of the generator. The exciter may include a second controller that may receive a field reference voltage from the first controller. The second controller may then determine a current set point based on the field reference voltage and enter into a field current regulator mode based on the current set point. The field current regulator mode may cause the exciter to provide the DC voltage to the rotor until a field current feedback from the rotor is equal to or greater than the current set point. The second controller may then enter into a field voltage regulator mode, thereby causing the exciter to regulate a field voltage feedback form the rotor to be substantially equal to the field reference voltage.

In another embodiment, a method for initializing a generator may include sending a field reference voltage to an exciter that may provide a direct current (DC) current and a DC voltage to a rotor of a generator based on a current set point that corresponds to the field reference voltage. The method may then include receiving a voltage feedback signal output by the generator, determining one or more locations of one or more poles of the generator based on the voltage feedback signal, and sending one or more firing signals to one or more switches of a starter after the locations of the poles have been determined. The switches may couple the voltage to a stator of the generator.

In yet another embodiment, a system may include a turbine and a generator that may be coupled together, such that the generator may provide power to an electrical grid. The system may also include an exciter that may couple a direct current (DC) current and a DC voltage to a rotor of the generator. The exciter may include a first controller that may receive a field reference voltage from the starter, determine a current set point based on the field reference voltage, and increase the DC current provided to the rotor until the DC current is substantially equal to the current set point. The system may also include a starter that may couple a voltage to a stator of the generator when the DC current provided to the rotor is substantially equal to the current set point.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
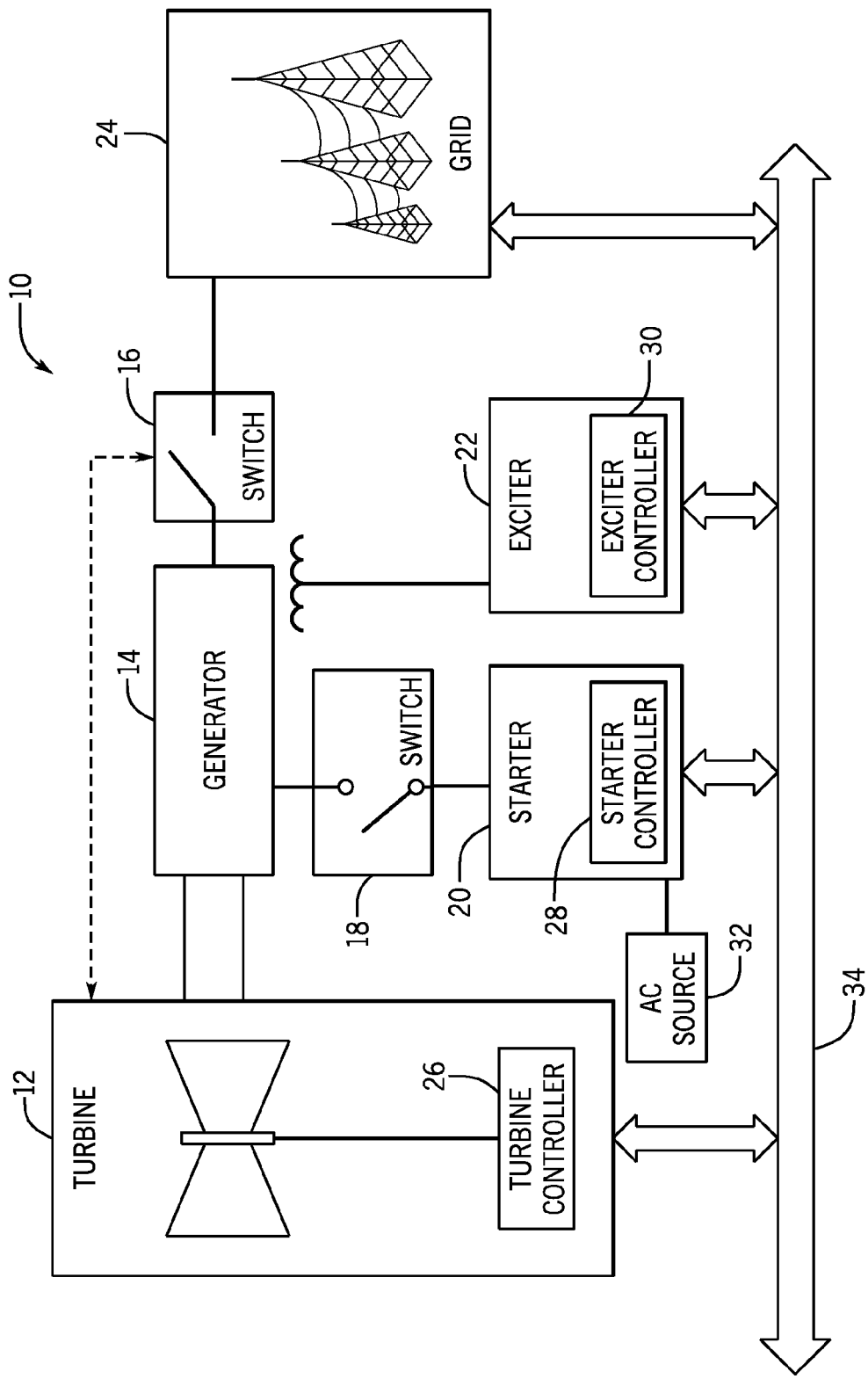
FIG. 1 illustrates a block diagram of a turbine-generator system, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

When a generator of a turbine-generator system is not in use (i.e., offline), a turning gear motor may rotate a shaft of a generator at a relatively slow speed (e.g., 6 rpm) as compared to a speed that the generator's shaft may rotate when providing power to an electrical grid (i.e., online). As such, in order for the generator to begin providing power to the electrical grid, the rotation of the generator's shaft may be accelerated from a relatively slow offline speed to a rated speed.

In one embodiment, a starter component and an exciter component may be used to accelerate the rotation of the generator's shaft to the rated speed. As such, the starter component and the exciter component may initially operate the generator as motor to accelerate the rotations of the generator's shaft. Keeping this in mind, the starter component may first issue a field voltage reference to the exciter component. The field voltage reference may correspond to an amount of direct current (DC) voltage that the exciter component may provide to field winding of a rotor of the generator. Upon receiving or intercepting the field voltage reference, the exciter component may calculate an equivalent current set point based on the field voltage reference. The exciter component may then define the current set point as a voltage output by the generator. As such, the exciter component may enter into a field current regulator (FCR) mode based on the defined voltage output. That is, the exciter component may use the equivalent current set point to calculate a voltage set point that corresponds to a voltage output by the generator being initialized. Generally, the calculated voltage set point may be up to two times the rated voltage output of the generator since the exciter component is operating in the FCR mode. After calculating the voltage set point and while operating in the FCR mode, the exciter component may immediately provide the field windings of the rotor with a DC voltage that may corresponds to the voltage set point. As a result, the exciter component may rapidly increase the DC current provided to the rotor of the generator according to a pre-defined function to increase the voltage output by the generator more quickly. After the DC current provided to the field windings of the rotor is equal to or greater than the current set point, the exciter component may exit the FCR mode and enter into a field voltage regulator (FVR) mode. While operating in the FVR mode, the exciter component may regulate the DC voltage provided to the field windings of the rotor, such that the DC voltage substantially matches the field reference voltage.

As the exciter component increases the DC current provided to the rotor of the generator, the strength of a magnetic field between the rotor and a stator of the generator increases, thereby increasing a speed at which the generator's shaft rotates. Moreover, as the rotational speed of the generator's shaft increases, the magnitude of a terminal voltage output by the generator also increases. The starter component may then receive voltage and current feedback signals from the generator and determine locations of poles of the generator based on the voltage and current feedback signals. After determining the locations of the poles of the generator, the starter component may receive a field current feedback from the exciter component and determine whether the field current feedback is greater than or equal to some minimum value. When the field current feedback is greater than or equal to the minimum value, the starter component may begin sending firing signals to switches located within the starter component. As such, the starter component may begin providing controlled alternating current (AC) power to the stator of the generator via the switches, thereby creating a magnetic field between the rotor and the stator of the generator. This magnetic field may cause the rotational speed of the shaft of the generator to increase. After the shaft of the generator starts rotating at its rated speed, the starter component may be disconnected from the generator and a turbine coupled to the shaft of the generator may initialize and soon begin rotating the shaft. After the turbine has been initialized, the generator may cease from operating as a motor, start operating as a generator, and begin outputting voltage. As such, a controller may monitor the voltage output by the generator and may synchronize the frequency and phase of the voltage output by the generator with the frequency and phase of a voltage of the electrical grid coupled to the generator via a switch (e.g., circuit breaker). After the frequency and phase of the voltage output by the generator are synchronized with the frequency and phase of the voltage of the electrical grid, the controller may send a signal to the switch coupled between the generator and the electrical grid to close, such that the generator may effectively provide power to the electrical grid. Keeping this in mind, additional details regarding initializing a generator are provided below with reference to FIGS. 1-3.

By way of introduction, FIG. 1 illustrates a block diagram of a turbine-generator system 10 that may be employed to efficiently initialize a generator to provide power to an electrical grid. As shown in FIG. 1, the turbine-generator system 10 may include a turbine 12, a generator 14, a switch 16, a switch 18, a starter component 20, an exciter component 22, and an electrical grid 24. The turbine 12 may include any one or more turbines and may be configured as a simple cycle or a combined cycle. By way of example, the turbine 12 may include a gas turbine, a wind turbine, a steam turbine, a water turbine, or any combination thereof. In the turbine-generator system 10, the mechanical work output by the turbine 12 may rotate a shaft of the generator 14. In general, the generator 14 may then convert the rotation of the shaft into electrical energy that may be output to the electrical grid 24.

The starter component 20 may be a variable frequency drive, a load commutated inverter (LCI), or a similar type of electrical device that may output an alternating current (AC) voltage that may be provided to a stator of the generator 14. In one embodiment, the starter component 20 may receive an AC voltage from an AC voltage source 32 and may convert the AC voltage into the controlled AC voltage, which may be provided to the stator of the generator via the switch 18.

The exciter component 22 may include an electrical circuit that provides direct current (DC) current and a DC voltage to field windings of a rotor of the generator 14, thereby inducing a magnetic field within the generator 14. The magnetic field may then cause the rotor to spin inside the generator and rotate the shaft of the generator 14. In addition to creating the magnetic field within the generator 14, the exciter component 22 may be used to control the frequency, amplitude, and phase properties of the voltage output by the generator 14. As such, the exciter component 22 may be used to synchronize the voltage output by the generator 14 with the voltage of the electrical grid 24 after the generator's shaft rotates at its rated speed.

The turbine 12, the starter component 20, and the exciter component 22 may include a turbine controller 26, a starter controller 28, and an exciter controller 30, which may be used to control the turbine 12, the starter component 20, and the exciter component 22, respectively. The turbine controller 26, the starter controller 28, and the exciter controller 30 may each include a communication component, a processor, a memory, a storage, input/output (I/O) ports, and the like. The communication component may be a wireless or wired communication component that may facilitate communication between each component in the turbine-generator system 10, various sensors disposed about the turbine-generator system 10, and the like. The processor may be any type of computer processor or microprocessor capable of executing computer-executable code. The memory and the storage may be any suitable articles of manufacture that can serve as media to store processor-executable code, data, or the like. These articles of manufacture may represent non-transitory computer-readable media (i.e., any suitable form of memory or storage) that may store the processor-executable code used by the processor to, among other things, perform operations that may be used to control the turbine 12, the starter component 20, and the exciter component 22. The non-transitory computer-readable media merely indicates that the media is tangible and not a signal. The turbine controller 26, the starter controller 28, and the exciter controller 30 may communicate with each other via a communication network 34. The communication network 34 may include an Ethernet-based network, such as the Unit Data Highway (UDH) provided by General Electric.

Generally, the turbine 12 may rotate a shaft in the generator 14, such that the generator 14 outputs a voltage. The voltage output of the generator 14 may then be synchronized with the voltage of the electrical grid 24 and provided to the electrical grid 24 via the switch 16. As mentioned above, when the generator 14 is not being used to provide power to the electrical grid 24, a turning gear motor (not shown) may rotate the generator's shaft at a low speed (e.g., 6 rpm) as compared to the rotational speed of the generator's shaft when the generator 14 is providing power to the electrical grid 24. As such, in one embodiment, to start ramping up the speed at which the generator's shaft may rotate, the starter controller 26 may send a field command to the exciter controller 30. The field command may include field reference voltage value or a current set point that may correspond to 80% of the Amps of the Field at No Load (AFNL).

After receiving the field command, the exciter controller 30 may enter into a field voltage regulator (FVR) mode and compare the field reference voltage value with a field voltage feedback from the field windings of a rotor of the generator 14. Based on a difference between the voltage set point and the field voltage feedback (i.e., error), the exciter controller 30 may adjust a direct current (DC) current that the exciter component 22 provides to the field windings of the rotor of the generator 14. Here, the exciter controller 30 may use the FVR mode to control DC current provided to the generator 14 based on the error between the voltage set point and the field voltage feedback.

After sending the field command, the starter controller 26 may wait a sufficient amount of time (e.g., three field time constants, approximately 18-25 seconds) for the field voltage of the rotor to reach approximately 95% of the voltage set point to allow the exciter component 22 to establish a uniform flux within the generator 14. The starter controller 26 may then send a firing command to switches in the starter component 20, thereby providing power to the stator of the generator 14 and ramping up the speed at which the shaft of the generator 14 rotates. However, by waiting for the sufficient amount of time to pass before firing the switches in the starter component 20, the starter controller 26 may not efficiently initialize the generator 14. That is, the locations of the generator poles may be identified prior to the expiration of the, for example, three field time constants (e.g., 18-25 seconds).

Figure 2:
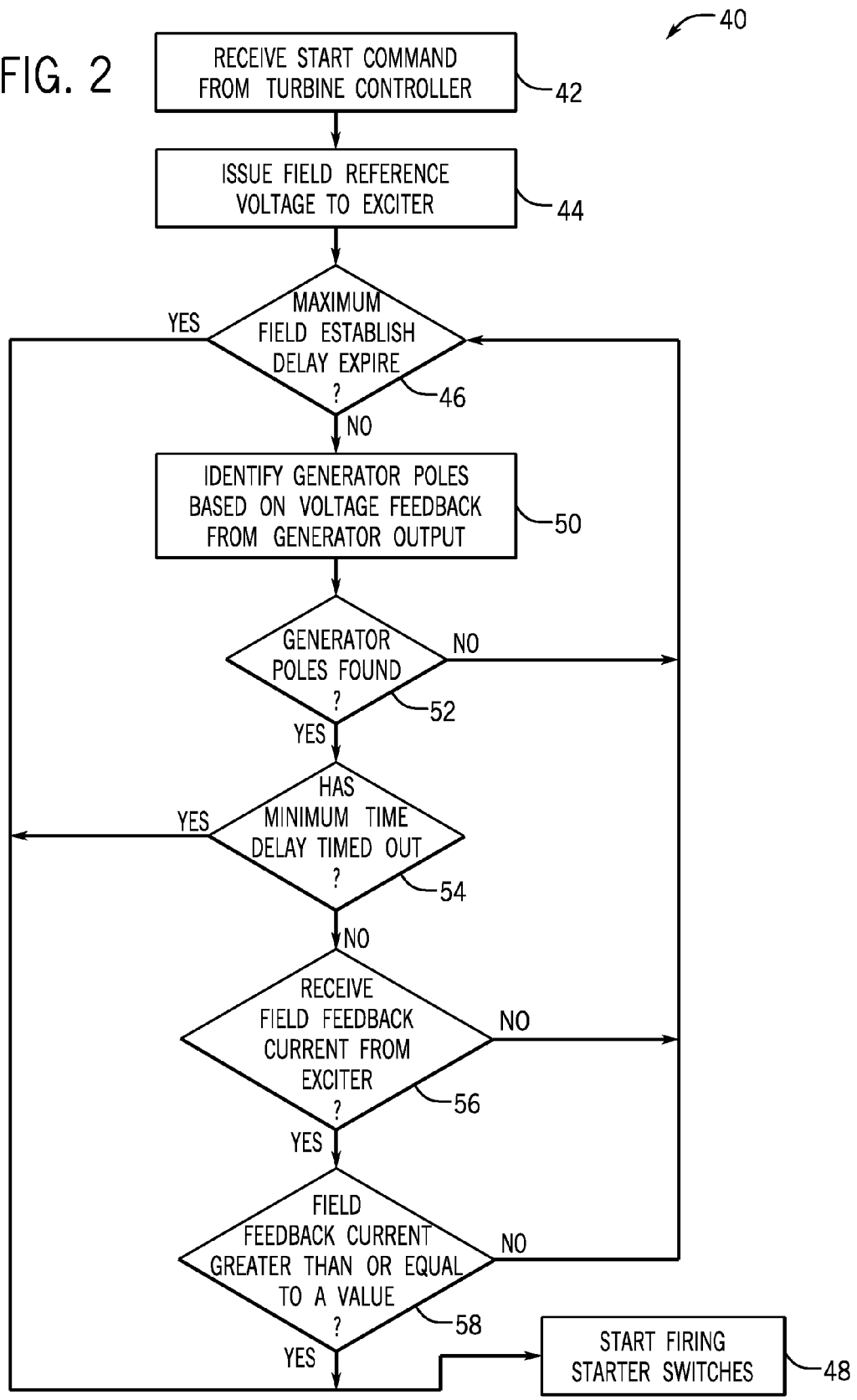
FIG. 2 illustrates a flowchart of a method employed by a starter component of the turbine-generator system of FIG. 1 to initialize the generator in the turbine-generator system, in accordance with an embodiment.

Keeping the foregoing in mind, FIG. 2 illustrates a flow chart of a method 40 that the starter controller 28 may employ to initialize the generator 14 more efficiently. That is, the method 40 may enable the starter component 20 to begin firing its switches prior to the expiration of the sufficient amount of time discussed above, thereby enabling the shaft of the generator to rotate at its rated speed sooner.

Referring now to FIG. 2, at block 42, the starter controller 28 may receive a start command from the turbine controller 26. In one embodiment, the turbine controller 26 may receive a start command from a user. In some cases, the user may provide the start command to the turbine controller 26 based on a request from a utility or the like to provide additional power to the electrical grid 24.

At block 44, the starter controller 28 may issue a field reference voltage to the exciter controller 30 via the communication network 34. The field reference voltage may correspond to an amount of DC voltage that the exciter component 22 may provide field windings of a rotor of the generator 14. The exciter controller 30 may then determine a current set point based on the field reference voltage. The exciter controller 30 may then enter into a field current regulator (FCR) mode based on the current set point. As such, the exciter controller 30 may define a voltage set point that corresponds to a desired voltage output of the generator 14. Generally, the defined voltage set point may be up to two times a rated voltage output of the generator 14. As such, the exciter controller 30 may immediately provide the field windings of the rotor with a relatively large DC voltage (e.g., larger than a rated DC voltage output by the exciter component 22). As a result, the exciter component 22 may rapidly increase the DC current provided to the field windings of the rotor.

Without entering into the FCR mode, the exciter controller 30 may be limited to increasing the DC current provided to the field windings of the rotor based on field constants associated with the exciter controller 30. While operating in the FCR mode, however, the exciter controller 30 may adjust the DC current that the exciter component 22 provides to the field windings of the rotor of the generator 14 based on a difference between the voltage set point and a field voltage feedback output by the generator 14 (i.e., error). Moreover, while the exciter controller 30 operates in the FCR mode, the exciter controller 30 may monitor the field current feedback from the rotor. Once the field current feedback from the rotor is equal to or greater than the current set point, the exciter controller 30 may exit the FCR mode and enter a field voltage regulator (FVR) mode to regulate a DC voltage provided to the rotor of the generator 14 based on an error between the field reference voltage and a field voltage feedback from the rotor. Additional details with regard to the operations of the exciter controller 30 with respect to the method 40 will be described below with reference to FIG. 3.

At block 46, the starter controller 28 may determine whether a maximum field establish delay time has passed or expired. For example, the maximum field establish delay time may correspond to three field delay constants or an amount of time that may allow the exciter component 22 to establish a uniform flux within the generator 14. If the starter controller 46 determines that the maximum field establish delay time has expired, the starter controller 28 may proceed to block 48 and start firing switches within the starter component 20. That is, at block 48, the starter controller 28 may send firing signals to switches, such as thyristors, insulated-gate bipolar transistors (IGBTs), and the like. The firing signals may cause the switches to close or provide the controlled AC voltage from the starter component 20 to the stator of the generator 14 via the switch 18, which may be closed at block 48.

If, however, at block 46, the maximum field establish delay time has not expired, the starter controller 28 may proceed to block 50 and identify or locate the poles of the generator 14 based on a voltage feedback received from terminals on the generator 14. The starter controller 28 may locate the poles of the generator 14 by identifying the flux zero crossing(s) of the voltage feedback from the generator 14.

At block 52, the starter controller 28 may determine whether the poles of the generator 14 have been found. If the starter controller 28 determines that the poles of the generator 14 have not been found, the starter controller 28 may return to block 46. If, however, the starter controller 28 determines that the poles of the generator 14 have been found, the starter controller 28 may proceed to block 54.

At block 54, the starter controller 28 may determine whether a minimum time delay has timed out. In certain systems, the generator 14 may be associated with a time constant based on its design and construction. That is, the generator 14 may include a lag to establish uniform field in an air gap of the generator 14 after a magnetic field magnetic field between the rotor and the stator of the generator 14 has been established by the exciter component 22. To account for this, the starter controller 28 may introduce a delay, such that it may accurately locate the poles of the generator 14. Based on the field current feedback, the starter controller 28 may estimate a status of the generator 14 before the starter controller 28 sends firing signals to the switches of the starter component 20. In sum, the minimum time delay may enable the starter controller 28 to have a sufficient amount of time to locate the pole positions of the generator 14 prior to the magnetic field between the rotor and the stator of the generator 14 reaches an acceptable magnetic strength (assuming that there is no field current feedback to the starter component 20). The minimum time delay may also make each start time for sending the firing signals to the switches of the starter component 20 more deterministic. If the minimum time delay has timed out, the starter controller 28 may proceed to block 48 and start firing the switches in the starter component 20. If, however, the minimum time delay has not timed out, the starter controller 28 may proceed to block 56.

At block 56, the starter controller 28 may determine whether a field feedback current has been received from the exciter component 22. If the field feedback current has not been received from the exciter component 22, the starter controller 28 may return to block 46. If, however, the field feedback current has been received from the exciter component 22, the starter controller 28 may proceed to block 58.

At block 58, the starter controller 28 may determine whether the field current feedback is greater than or equal to some value. If the field feedback current is less than the value, the starter controller 28 may return to block 46. If, however, the field feedback current is greater than or equal to the value, the starter controller 28 may proceed to block 48 and start firing the switches in the starter component 20. The starter component 20 may then provide the controlled AC voltage to the stator of the generator 14. The shaft of the generator 14 may then accelerate to the reference speed.

After the shaft of the generator 14 rotates at the reference speed, the turbine controller 26 may send a signal to the exciter component 22 to synchronize the frequency and phase of the voltage output by the generator 14 with the frequency and phase of the voltage of the electrical grid 24. After the frequency and phase of the voltage output by the generator 14 is synchronized with the frequency and phase of the voltage of the electrical grid 24, the turbine controller 26 may send a signal to the switch 16 to close, thereby providing power to the electric grid 24.

Figure 3:
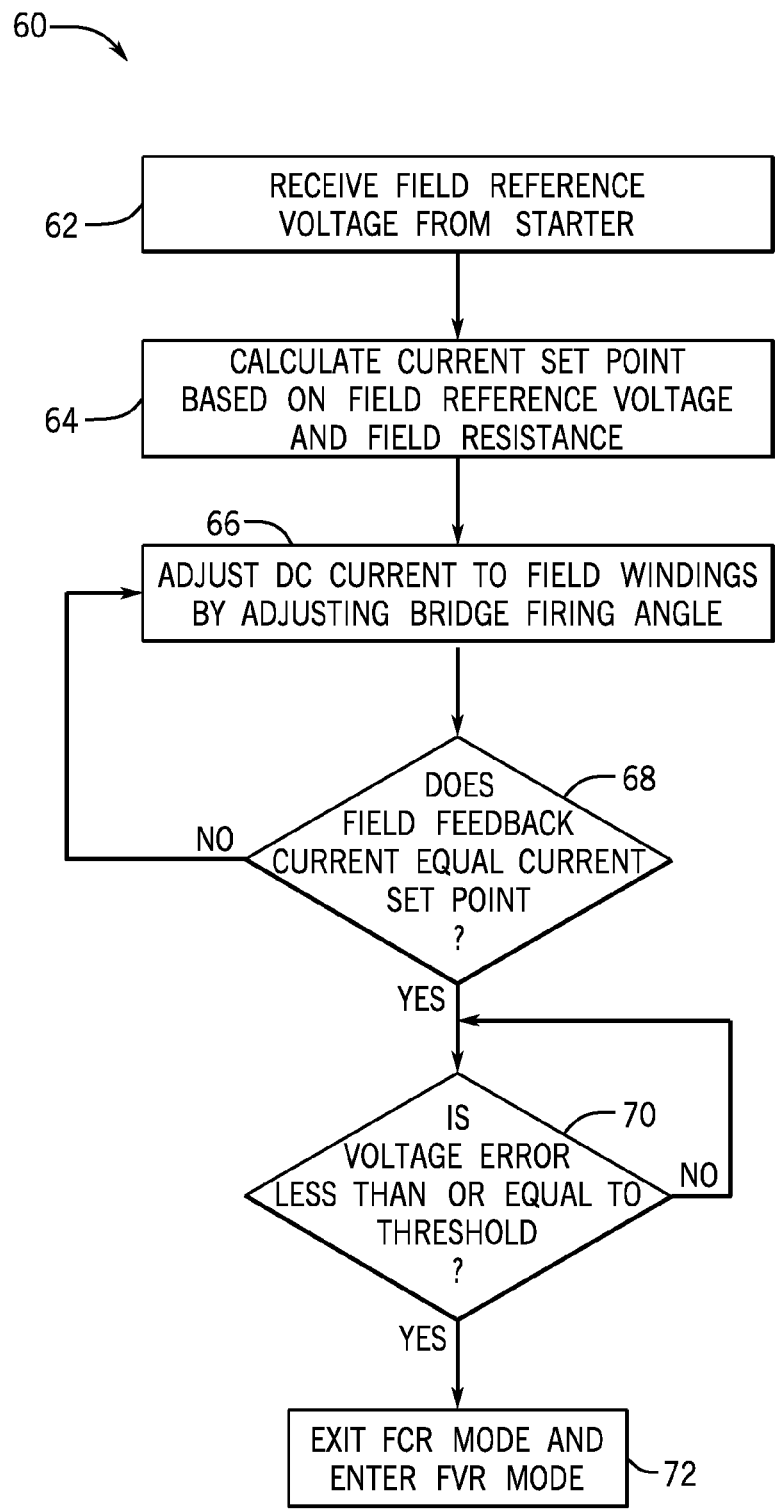
FIG. 3 illustrates a flowchart of a method employed by an exciter component of the turbine-generator system of FIG. 1 to initialize the generator in the turbine-generator system, in accordance with an embodiment.

As mentioned above, the starter controller 28 may issue a field reference voltage to the exciter controller 30 at block 44. Keeping this in mind, FIG. 3 illustrates a flowchart of a method 60 that the exciter controller 30 may employ to initialize the generator 14 upon receiving the field reference voltage from the starter controller 28. Referring now to FIG. 3, at block 62, the exciter controller 30 may receive the field reference voltage from the starter controller 28.

At block 64, the exciter controller 30 may calculate a current set point based on the field reference voltage and a field resistance of the field windings of the rotor of the generator 14. The exciter controller 30 may then enter into a field current regulator (FCR) mode based on the current set point. By defining the current set point, the exciter controller 30 may apply two times or more of the rated DC voltage to the field windings of the rotor of the generator 14 to quickly achieve the current set point. That is, after determining the current set point, the exciter controller 30 may define a voltage set point that corresponds to the voltage output of the generator 14 to enable the field current feedback from the rotor to achieve the current set point more quickly.

Keeping the foregoing in mind, the method 60 may enable the field current in the rotor to increase at a faster rate than when operating in a field voltage regulator (FVR) mode, thereby establishing the flux in the air gap in the generator 14 at a faster rate. By increasing the field current in the rotor at a faster rate, the starter controller 28 may identify the poles of the generator 14 (e.g., rotor poles) at a faster rate. In addition to identifying the poles more quickly, the starter controller 28 may determine whether there enough magnetic flux is present in the generator 14 to begin sending firing signals to the switches in the starter component 20, thereby providing the controlled AC voltage to the stator of the generator 14. By increasing the rate at which the field current in the rotor increases, the magnetic flux in the generator 14 may also increase at a faster rate, thereby accelerating the rotation of the shaft of the generator 14. Acceleration on the shaft may be defined by an electrical torque produced. Torque may be defined by the flux in the generator 14. As such, the greater the flux in the generator 14, the greater the torque applied to the shaft of the generator 14, and thus the greater the acceleration of the rotation of the shaft of the generator 14.

As such, at block 66, the exciter controller 30 may provide the field windings of the rotor with a relatively large DC voltage by rapidly increasing the DC current provided to the field windings of the rotor. The exciter controller 30 may increase adjust the DC current by adjusting firing angle signals that may be sent to a rectifier bridge or switching circuit in the exciter component 22.

At block 68, the exciter controller 30 may receive a field feedback current from the exciter component 22. The field current feedback may indicate an amount of DC current that the exciter component 22 may be providing the rotor of the generator 14. After receiving the field current, feedback, the exciter controller 30 may compare the field current feedback to the current set point calculated at block 64. In this manner, at block 68, the exciter controller 30 may determine whether the field current feedback is substantially equal to the current set point. If the field current feedback is not substantially equal to the current set point, the exciter controller 30 may return to block 66 and continue adjusting the DC current provided to the field windings.

If, however, at block 68, the field current feedback is substantially equal to the current set point, the exciter controller 30 may proceed to block 70. At block 70, the exciter controller 30 may determine whether a voltage error between the field reference voltage and a field voltage feedback of the field windings of the rotor of the generator 14 is less than or equal to some threshold. If the error is greater than the threshold, the exciter controller 30 may return to block 70 and continue to monitor the voltage error.

If, at block 70, the error is less than or equal to the threshold, the exciter controller 30 proceed to block 72. At block 74, the exciter controller 30 may exit the FCR mode and enter a field voltage regulator (FVR) mode. That is, the exciter controller 30 may provide the DC voltage to the field windings of the rotor of the generator 14 to regulate the amplitude of the voltage of the field windings of the rotor, thereby regulating the voltage output by the generator 14.

After the exciter controller 30 enters the FVR mode, the starter controller 28 may begin sending firing signals to the switches in the starter component 20. As such, the starter component 20 may provide a controllable AC voltage to the stator of the generator 14 to continue accelerating the rotational speed of the shaft of the generator 14. As such, the generator 14 may still be operating as a motor. However, as the rotational speed of the shaft of the generator 14 increases, the turbine 12 may begin to add torque to the shaft of the generator 14. For example, the turbine 12 may begin adding torque to the shaft of the generator 14 when the rotational speed of the shaft of the generator 14 is approximately 60% of its rated speed. In one embodiment, the starter component 20 may continue contributing to the torque of the shaft of the generator 14 via the controllable AC voltage provided to the stator of the generator 14 until the rotational speed of the shaft of the generator 14 is approximately 90% of its rated speed. Here, the turbine 12 may provide all of the torque to the shaft of the generator 14, thereby enabling the generator 14 to operate as a generator and provide power to an electric grid or the like.

Technical effects of the present disclosure include efficiently accelerating the shaft of the generator 14 such that the generator 14 of the turbine-generator system 10 may efficiently initialize. By receiving a feedback voltage from the generator 14 while the exciter component 22 ramps up the DC current provided to the rotor of the generator 14, the starter controller 28 may quickly identify the poles of the generator 14 and begin accelerating the rotation of the shaft of the generator 14 using the starter component 20.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbine;
   a generator configured to couple to the turbine, wherein the generator is configured to provide power to an electrical grid;
   a starter configured to provide a voltage to a stator of the generator, wherein the starter comprises a first controller configured to control firing of one or more switches configured to provide the voltage to the stator;
   an exciter configured to provide a direct current (DC) voltage and a DC current to a rotor of the generator, wherein the exciter comprises a second controller configured to:
   receive a field reference voltage from the first controller;
   determine a current set point based on the field reference voltage;
   enter into a field current regulator mode based on the current set point, wherein the field current regulator mode is configured to cause the exciter to provide the DC voltage to the rotor until a field current feedback from the rotor is equal to or greater than the current set point; and
   enter into a field voltage regulator mode when the field current feedback from the rotor is equal to or greater than the current set point, wherein the field voltage regulator mode is configured to cause the exciter to regulate a field voltage feedback from the rotor to be substantially equal to the field reference voltage.

2. The system of claim 1, wherein the first controller is configured to provide the voltage to the stator by:
   receiving a voltage feedback signal output by the generator;
   determining one or more locations of one or more poles of the generator based on the voltage feedback signal; and
   sending one or more firing signals to the one or more switches after determining the locations of the poles.

3. The system of claim 2, wherein the first controller is configured to:
   receive the field current feedback from the exciter; and
   send the one or more firing signals to the one or more switches when the field feedback current is greater than or equal to a value.

4. The system of claim 1, wherein the turbine comprises a gas turbine, a wind turbine, a steam turbine, a water turbine, or any combination thereof.

5. The system of claim 1, wherein the starter comprises a variable frequency drive or a load commutated inverter (LCI).

6. The system of claim 1, wherein the exciter is configured to synchronize a first voltage output by the generator with a second voltage associated with an electrical grid configured to couple to the generator.

7. The system of claim 1, wherein the current set point corresponds to approximately 80% of an Amps of the Field at No Load (AFNL) value.

8. The system of claim 1, wherein the controller is configured to determine the one or more locations of the one or more poles of the generator by identifying one or more flux zero crossings that corresponds to the voltage feedback signal.

9. The system of claim 1, wherein the controller is configured to:
   determine whether a minimum time delay has timed out; and
   send the one or more firing signals to the one or more switches when the minimum time delay has timed out.

10. The system of claim 1, wherein the starter is configured to accelerate a rotation of a shaft of the generator until the shaft rotates at a reference speed.

11. A method, comprising:
    sending a field reference voltage to an exciter configured to provide a direct current (DC) current and a DC voltage to a rotor of a generator based on a current set point that corresponds to the field reference voltage;
    receiving a voltage feedback signal output by the generator;
    determining one or more locations of one or more poles of the generator based on the voltage feedback signal; and
    sending one or more firing signals to one or more switches of a starter after determining the locations of the poles, wherein the starter is configure to provide a voltage to a stator of the generator via the one or more switches.

12. The method of claim 11, comprising:
    receiving a field current feedback from the exciter; and
    sending the one or more firing signals to the one or more switches when the field current feedback is greater than or equal to a value.

13. The method of claim 11, comprising:
    determining whether a minimum time delay has timed out; and
    sending the one or more firing signals to the one or more switches when the minimum time delay has timed out.

14. The method of claim 11, wherein determining the one or more locations of the one or more poles of the generator comprises identifying one or more flux zero crossings that corresponds to the voltage feedback signal.

15. A system, comprising:
    a generator configured to couple to a turbine, wherein the generator is configured to provide power to an electrical grid;
    an exciter configured to provide a direct current (DC) current and a DC voltage to a rotor of the generator, wherein the exciter comprises a first controller configured to:

receive a field reference voltage from a second controller;

determine a current set point based on the field reference voltage; and increase the DC current provided to the rotor until the DC current is substantially equal to the current set point;

a starter comprising the second controller, wherein the starter is configured to provide a voltage to a stator of the generator after the DC current provided to the rotor is substantially equal to the current set point.

16. The system of claim 15, wherein the starter is configured to provide the voltage to the stator by sending one or more firing signals to one or more switches of the starter, wherein the switches are configured to provide the voltage to the stator.

17. The system of claim 15, wherein the second is controller configured to:

determine one or more locations of one or more poles of the generator based on a voltage feedback signal output by the generator; and send one or more firing signals to one or more switches of the starter after determining the locations of the poles, wherein the switches are configured to provide the voltage to the stator of the generator.

18. The system of claim 17, wherein the second controller is configured to send the one or more signals by:

receiving a field current feedback from the exciter; and sending the one or more firing signals to the one or more switches when the field feedback current is greater than or equal to a value.

19. The system of claim 17, wherein the second controller is configured to send the one or more signals by:

determining whether a minimum time delay has timed out; and sending the one or more firing signals to the one or more switches when the minimum time delay has timed out.

20. The system of claim 15, wherein the starter comprises a variable frequency drive or a load commutated inverter (LCI).

\* \* \* \* \*